United States Patent
Farnam

[15] 3,679,218
[45] July 25, 1972

[54] UNITIZED VALVE PLATE, GASKETS AND THE LIKE

[72] Inventor: Robert G. Farnam, New Lisbon, Wis.
[73] Assignee: F. D. Farnam Co.
[22] Filed: March 3, 1969
[21] Appl. No.: 803,535

[52] U.S. Cl. .........................................277/233, 277/235 R
[51] Int. Cl. ............................................................F16j 15/12
[58] Field of Search...............277/235 B, 235 R, 166, 227, 277/233

[56] References Cited

UNITED STATES PATENTS

| | | | |
|---|---|---|---|
| 1,430,103 | 9/1922 | Nelson | 277/235 B |
| 2,753,199 | 7/1956 | Victor | 277/235 B X |

FOREIGN PATENTS OR APPLICATIONS

| | | | |
|---|---|---|---|
| 955,215 | 4/1964 | Great Britain | 277/235 B |

OTHER PUBLICATIONS

Bikerman, J. J., The Science of Adhesive Joints, N.Y., Academic Press, 1961, P. 202-203, TP 968 B5
Guttmann, W. H., Concise Guide To Structural Adhesives, N.Y., Reinhold, 1961, p. 2, TP 968 G8.

Primary Examiner—Edward J. Earls
Attorney—Mann, Brown, McWilliams & Bradway

[57] ABSTRACT

A unitized metal plate and gasket assembly in which a suitable gasket is firmly bonded to one or both sides of a metal plate with the unitized assembly having one or more die cut holes or apertures therethrough and with the unitized plate assembly being particularly suitable for use as a valve plate unit in automatic transmissions, but having other uses as well.

6 Claims, 18 Drawing Figures

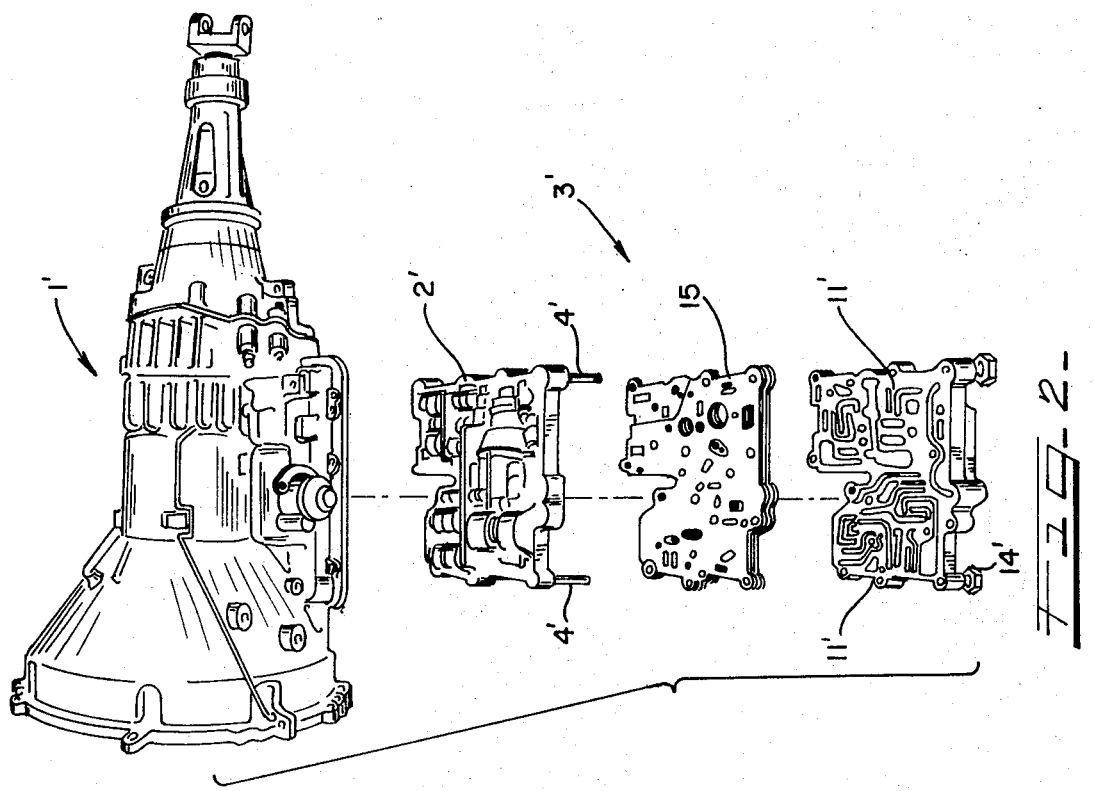
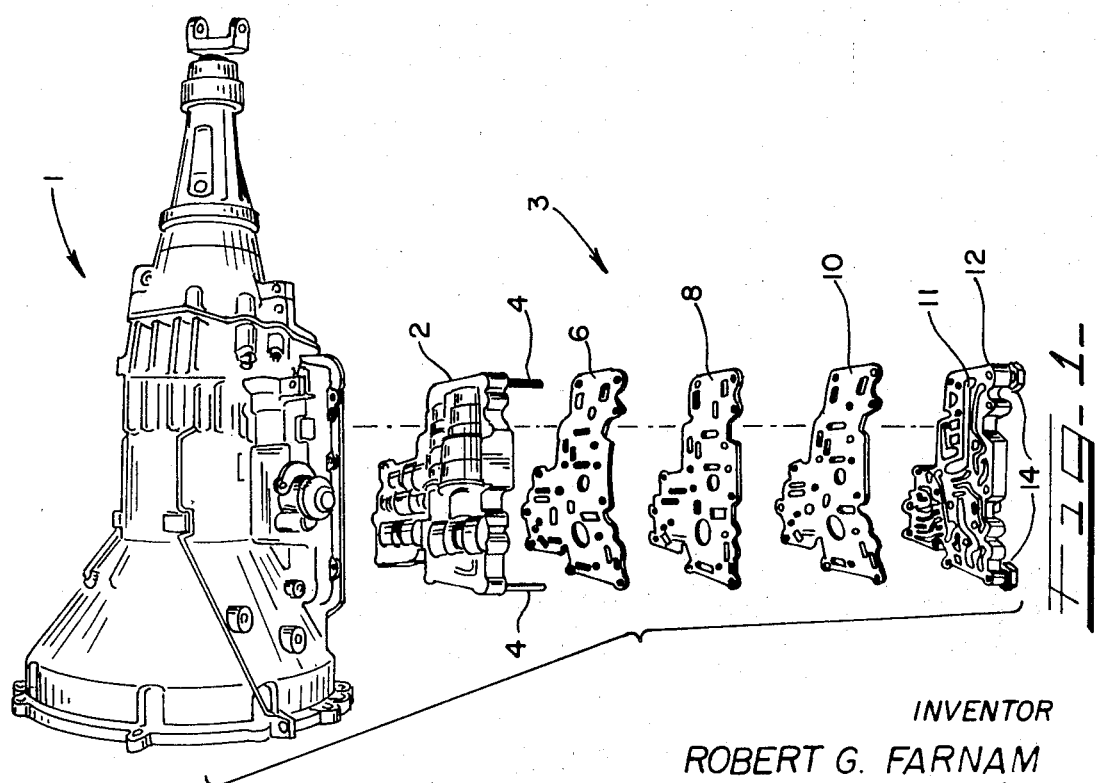
INVENTOR
ROBERT G. FARNAM
ATT'YS.

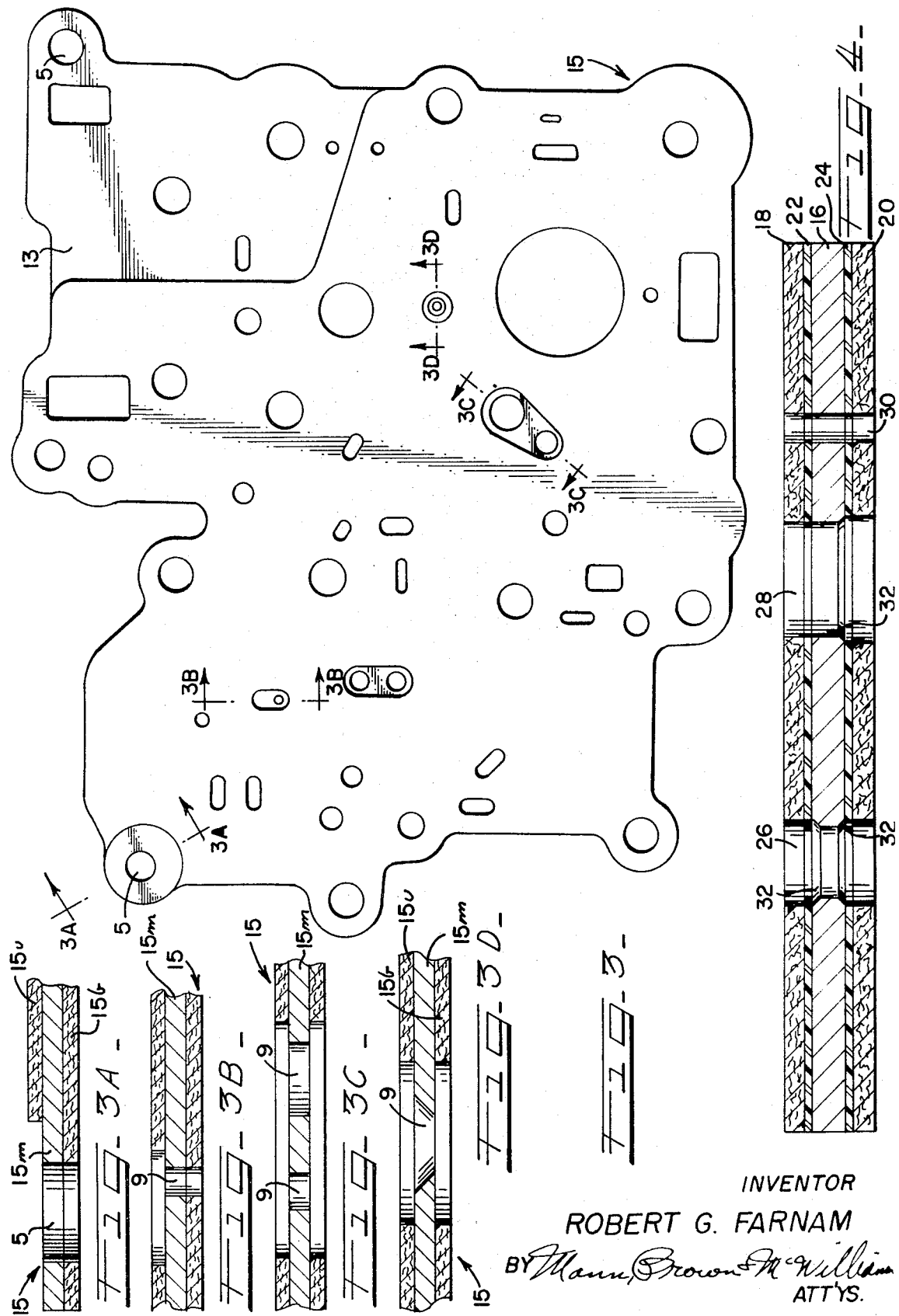

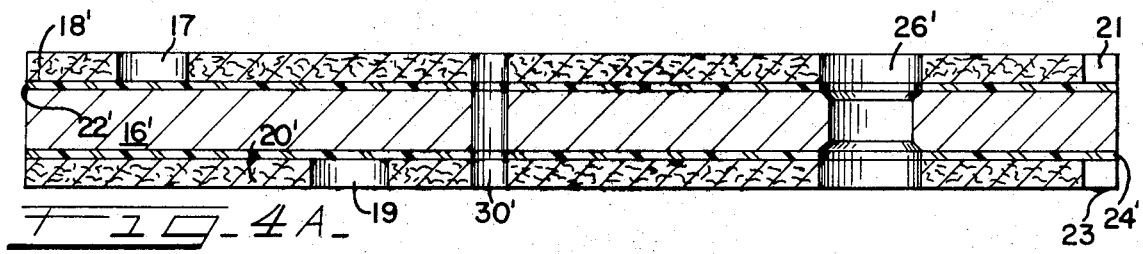
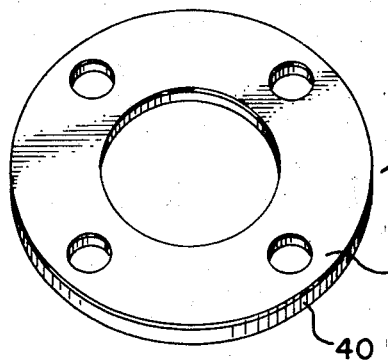
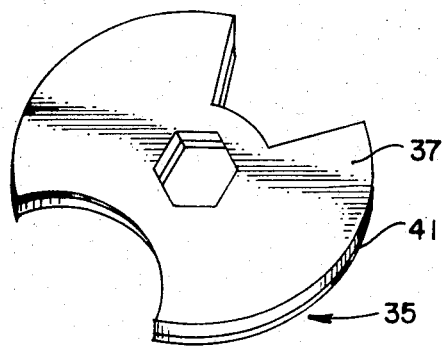
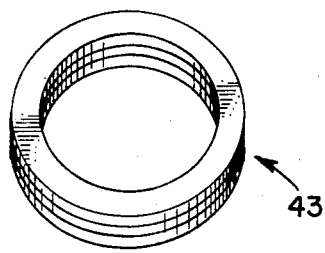
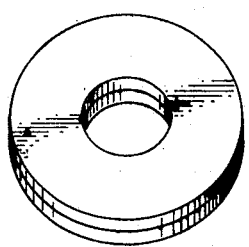
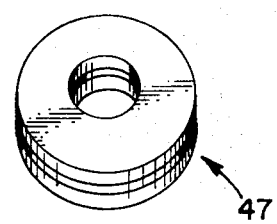
INVENTOR
ROBERT G. FARNAM
ATT'YS.

INVENTOR
ROBERT G. FARNAM
BY Mann, Brown & McWilliams
ATT'YS.

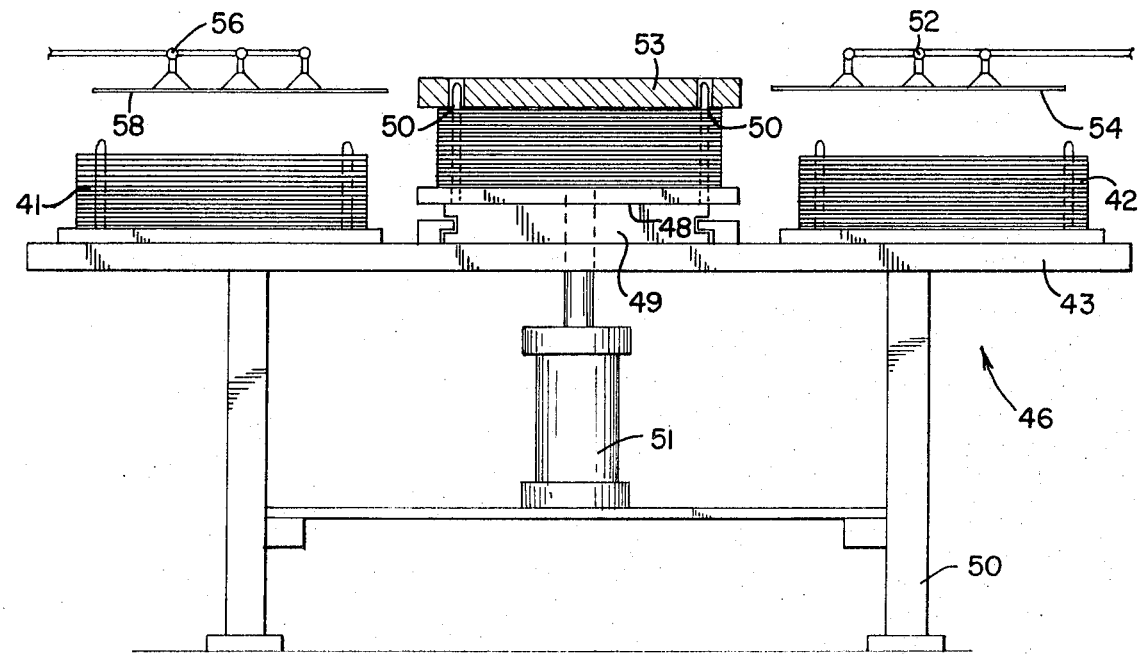
FIG-10-
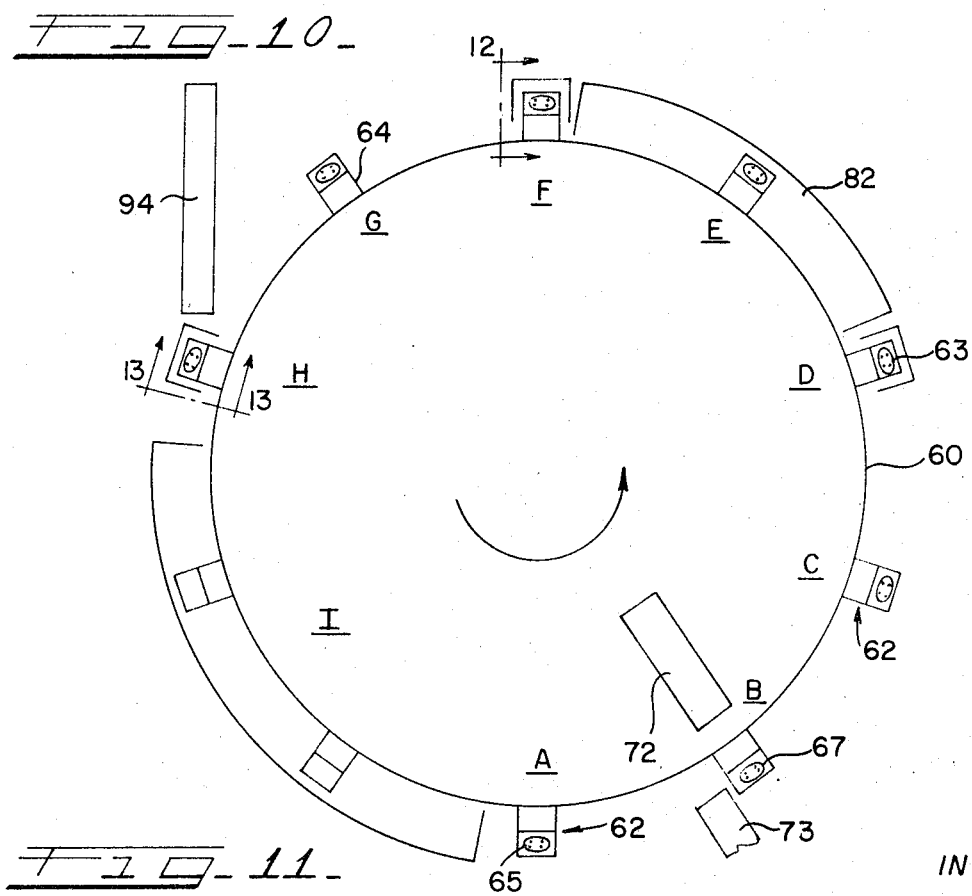
FIG-11-

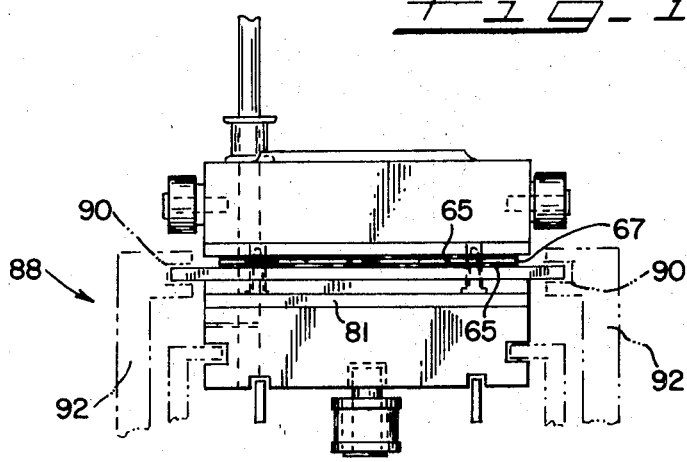
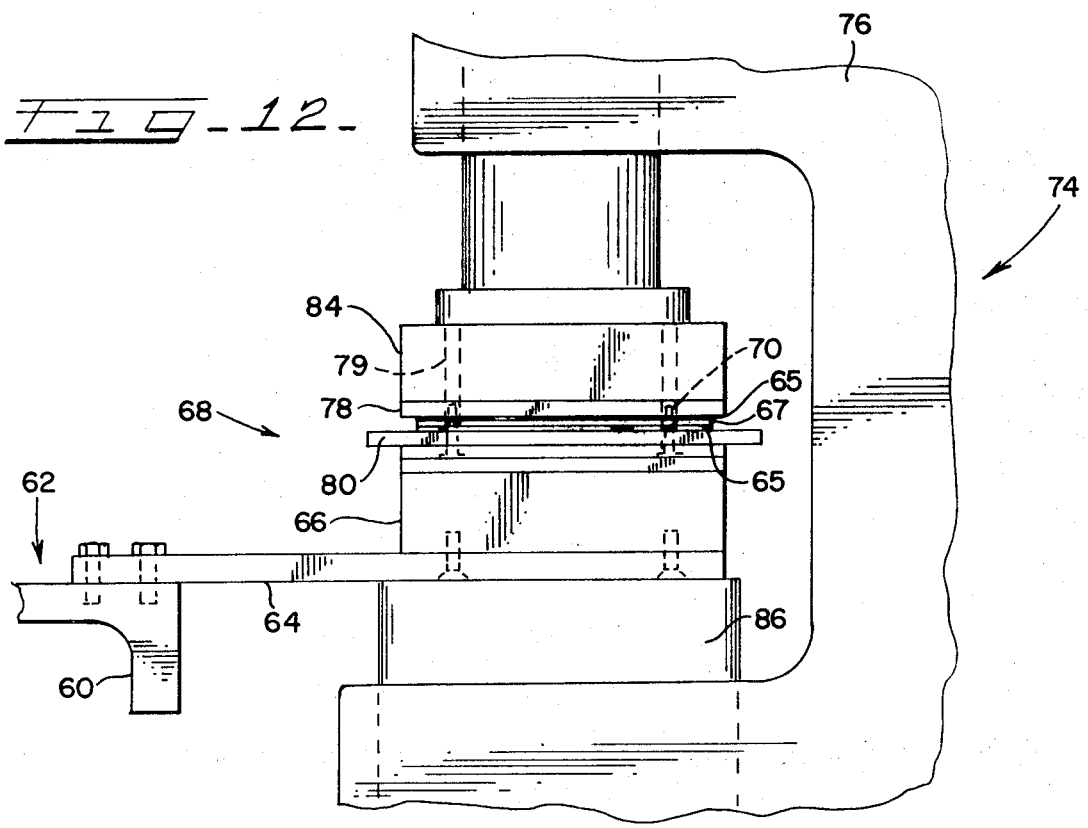

UNITIZED VALVE PLATE, GASKETS AND THE LIKE

BACKGROUND OF THE INVENTION

This invention relates to metal-backed gasket asemblies where the metal plate has gasket material applied to one or both sides of the metal plate and firmly adhered thereto for the purpose of effecting a seal. The invention has particular applicability to the automatic transmission field where in assembling the automatic transmissions or in repairing them it has been customary to apply the metal separator plates with one or more gaskets associated therewith as two or three individual components. The metal plates are ordinarily of a thickness of from 30 to 60 thousandths of an inch and the gaskets may run from approximately 0.007 inch to 0.015 inch and since these gaskets as well as the metal plates normally have a large number of die cut apertures therein, considerable difficulty has been experienced in the past in handling these components, and particularly the gasket components, due to their flimsiness.

The principle object of this invention, therefore, is to provide a unitized metal plate and gasket assembly which can be handled and applied, as a unit, and in which the bonding materials and procedures do not adversely affect the required physical characteristics of the gasket material or contaminate in any way the fluid that is passing through the transmission, or in contact with or through the separator plate.

Another object of the invention is to provide a unitized plate of this type which can be manufactured economically and which will withstand the rigors of use in a transmission.

It is still a further object of the invention to provide practical and efficient methods for making such a unitized plate assembly.

Further and other objects and advantages will become apparent as the disclosure proceeds and the description is read in conjunction with the accompanying drawings in which:

FIG. 1 is an exploded view of a transmission using a three-piece prior art valve plate assembly;

FIG. 2 is an exploded view similar to that of FIG. 1 but showing the application of a specific embodiment of the invention;

FIG. 3 is a plan view of the embodiment of the invention as depicted in FIG. 2;

FIG. 3A is a view taken along the line 3A—3A of FIG. 3;

FIG. 3B is a view taken along the line 3B—3B of FIG. 3;

FIG. 3C is a view taken along the line 3C—3C of FIG. 3;

FIG. 3D is a view taken along the line 3D—3D of FIG. 3;

FIG. 4 is a cross-sectional view of one embodiment of the invention in greatly exaggerated form;

FIG. 4A is a greatly exaggerated cross-sectional view of separately die cut components in assembled form making up another embodiment of the invention;

FIG. 5 is a perspective of another embodiment of the invention;

FIG. 6 is a perspective of another embodiment of the invention;

FIG. 7 is a perspective view of still another embodiment of the invention;

FIG. 10 is a side view of apparatus for fabricating one of the embodiments of the invention illustrating still another view of the invention;

FIG. 11 is a schematic plan view of another suitable apparatus for use in practicing the invention;

FIG. 12 is a view taken along the line 12—12 of FIG. 11, and

FIG. 13 is a view taken along the line 13—13 of FIG. 11.

Figure 8:
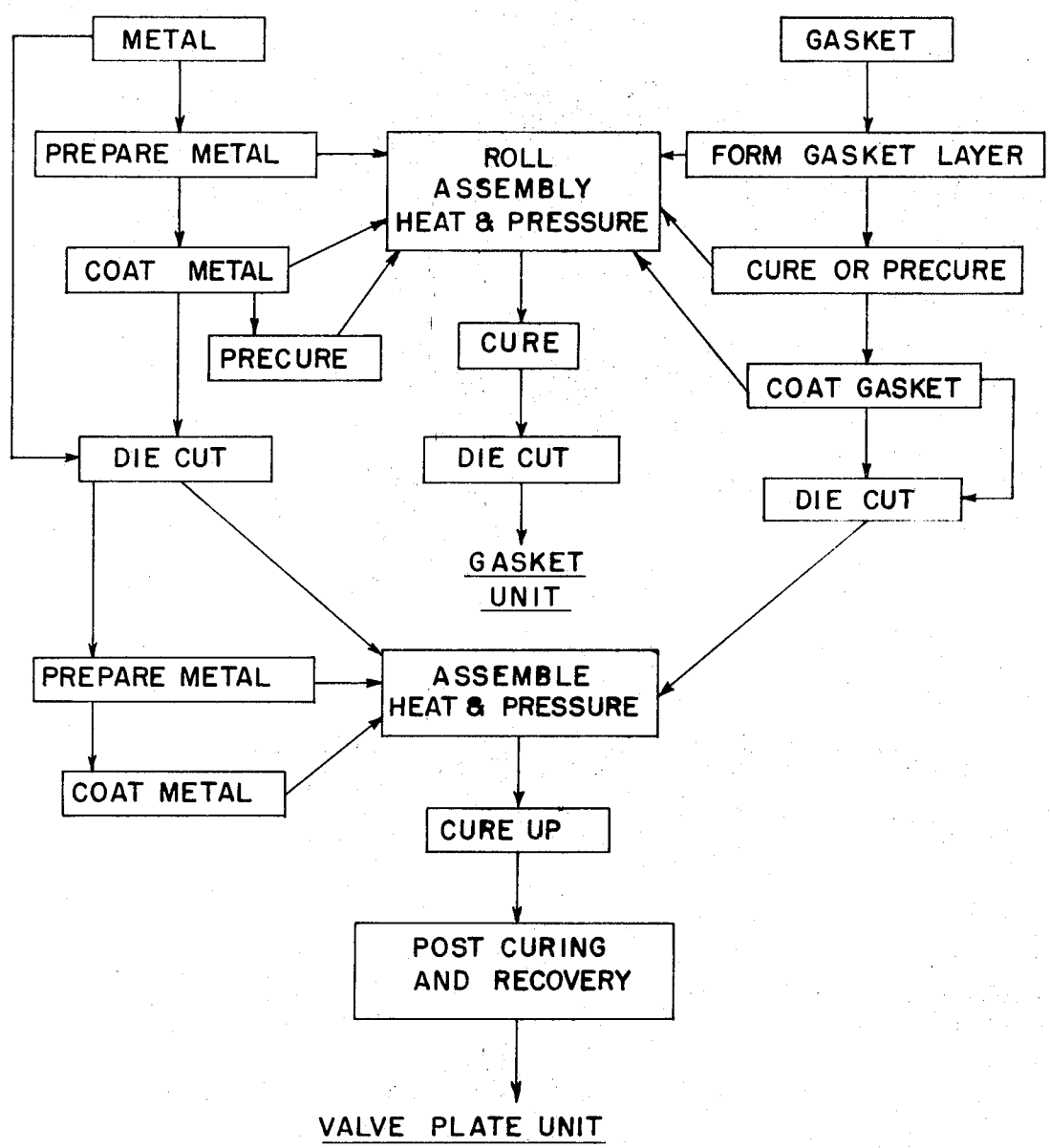
FIG. 8 is a flow diagram exemplifying several of the methods of fabricating embodiments of the invention.

Referring specifically to the drawings wherein like numerals of reference indicate like elements throughout and, specifically directing attention to FIG. 1, automatic transmission 1 is shown broken away to depict the upper valve body 2 of the regulator 3. Regulator 3 acts as a valving member for the flow of transmission fluid within the working components of transmission 1. The transmission depicted is one currently available in the General Motors line of cars and specifically may be found in the Cadillac automatic transmission. It will be seen that the valve regulator 3, shown in exploded fashion, comprises upper valve body 2 and lower valve body 12 with prior art metal valve plate 8 being positioned between two limp, deformable gaskets 6 and 10 of similar or identical configuration to valve plate or metal core 8. The holes and apertures in core or metal plate 8 and some of the corresponding ones in the gaskets 6 and 10 provide fluid passageways which direct and divert the transmission fluid into a multiplicity of interconnecting and discontinuous channels 11, some of which are shown in lower valve body 12. In assembly of the lower valve body 12 into the proper position for securement to the upper valve body 2, it is necessary to provide alignment pins such as 4 so that the gasket 6, valve plate 8 and gasket 10 can be properly aligned and assembled with relation to the upper valve body 2. Those skilled in the art will recognize also that there are ball valves in the form of spherical members which are positioned in various channels 11 and the corresponding channels of the upper valve body 2 (not shown). After the gaskets 6 and 10 and interposed plate 8 are properly aligned on guide pins 4, the bottom valve member 12 may be positioned and secured as by means of bolts 14 to the upper valve body 2 and the aligning pins 4 thereafter removed. The obvious shortcomings in assembling the valve plate into the valve regulator is fairly apparent in that a three-piece assemblage must be handled, which handling is often very cumbersome depending upon assembly techniques and the position of the valve regulator or automatic transmission. Where the valve regulator needs repairs on existing equipment, that is in automobiles, etc. having been in service for some time, it is very difficult to gain access to the valve regulator portion of the transmission and, in such instances, the use of guide pins such as 4 are mandatory for proper assembly. Obviously, the handling of gaskets 6 and 10 because of their conformability, flimsiness or ease of bending makes assembly difficult at best.

The gaskets 6 and 10 as well as the valve plate 8 must be separately handled, stored, inventoried and eventually shipped which also adds to the cost of fabricating new transmissions and/or repairing those that have been in service. Even when only one gasket is used in conjunction with a valve or separator plate, the problem is still present. With the herein disclosed invention, many of these shortcomings are overcome with the result that there is a substantial savings in labor cost, inventory cost, and warehousing cost.

Referring to FIG. 2, one embodiment of the invention is depicted as applied to the specific field of use illustrated in FIG. 1. The prime numbers refer to like elements found throughout FIG. 1 and it is abundantly clear that the unitized assemblage 15 replaces the three-piece assembly of elements 6, 8 and 10 shown in FIG. 1. The ease of manipulating the one-piece member 15 for assembly into the valve regulator 3' is obvious.

The one embodiment of the invention as shown in FIG. 2 has shown, through tests and otherwise, that sealability is significantly improved; torque retention at various clamp loads and at elevated temperatures is significantly improved; the dimensional stability; and fluid and erosion resistance of the composite or unitized assembly is significantly improved, all in comparison to the three-piece prior art assembly of gaskets and metal plate. Additionally, it has been found that the frictional properties, i.e., the tendency of gasket material or layer to move under extreme or high clamp loads is significantly reduced, and the releasing properties of the multiple component or unitized assemblage has been found to equal or exceed that of the prior art three-piece members.

From an economic standpoint, the one-point unit has significant advantages over the two or three members of the prior art. The purchasing, cataloging, and inventorying for services and the like requirements is greatly simplified in that instead of dealing with each component of the three-piece prior art assembly, only one part number is required for the composite unit and because there can be no mix-up or erroneous collation of the wrong gaskets with the metal plate, equipment failure and breakdown due to this is essentially eliminated. In original equipment manufacture as well as in later servicing of the equipment, the assembler or workman need handle only one part as opposed to two or three. The overall reduction in manpower and other costs is readily apparent.

More importantly, however, is the fact that a unitized component replaces a three-piece separate assembly, which unitized component meets or exceeds the performance characteristics of the old assembly. Thus, the unitized member has greater performance characteristics, along with economic advantage, than that now available. Thus, functional reliability along with economic features is now made available without any undesirable side effect or features.

FIGS. 3 through 3D, in which adhesive bond layers have been omitted for clarity, show in greater detail the configuration of an exemplary valve plate unit as illustrated in FIG. 2. It will be seen that the member 15 basically has an irregular configuration with spaced bolt holes 5 for assembly into the valve regulator 3'. In this instance metal plate 15m at bolt hole 5 has bottom gasket layer 15b of a congruent configuration whereas upper gasket layer 15u is spaced from bolt hole 5. It can be seen that a myriad of variations is possible with respect to fluid passageways in the metal plate 15m and the respective gasket layers 15u and 15b. Thus, the holes in the upper gasket layer 15u and/or the bottom gasket layer 15b may be the same size as or oversize with respect to the fluid passageways 9 in metal plate 15m. In still other instances, a total absence of both upper and bottom gasket layers will be desirable as at 13. Additionally, the fluid passageway 9 may be conical in cross-section as in FIG. 3D, the through passageway being countersunk or the like.

FIG. 4 illustrates in greater detail one specific embodiment of the invention as it would specifically apply to the environment described for FIG. 2. Here central metallic core or valve plate 16 has disposed on either side of its face surface upper and lower gasket layers 18 and 20 respectively with adhesive bond layer 22 and 24 retaining the gasket layers to the metal face surfaces of the metal plate 16. For purposes of illustration, the adhesive bonds or layers 22 and 24 are shown as being made up of discrete unitary layers. In some instances, depending upon modes of fabrication and assembly, individual layers within the adhesive bond layer will be discernible. This will be elaborated upon hereafter. However, ideally and under most conditions, the individual layer applied to either metal or gasket layer or forming a part of the gasket layer will coalesce and will be in essence but a single layer as 22 and 24 between the gasket and metal components of the assemblage.

The valve plate 16 is, in this instance, shown as having fluid passageway 26, a larger fluid passageway 28 in the approximate midsection and smaller fluid passageway 30. The gasket layers 18 and 20 as well as adhesive bond layers 22 and 24 have similar or identical fluid passageways therethrough. This, of course, allows for the flow of a fluid such as transmission oil from one portion of the valve regulator through the other which is necessary in the normal operation of an automatic transmission herein under discussion.

In the FIG. 4 embodiment of the invention, the fluid passageway 26 is shown as being coextensive in both the gasket layers 18 and 20 to the coined or chamfered passageway 26 in metal plate 16. The gasket and adhesive layers are also coextensive with fluid passageway 30 of plate 16. However, it will be noted that fluid passageway 28 is slightly larger as shown at 32 on only one surface of the metal plate 16 which provides a slightly larger opening at the surface of the gasket layer. The enlargements, as at 32, may be obtained as by chamfering, coining or the like during the die-cutting or forming operation of individual metal plates 16. The reason for the coined or chamfered opening is to cut down on noises in the transmission caused by the rapid flow of transmission fluid through the various fluid passageways of the valve regulator.

As has been shown, in some instances, the valve plate and gasket layers will be of identical configuration conforming in all respects to one another. In other instances, the valve plate 16 will be of slightly different configuration from the gasket layers as in the outside perimeter as well as differing in the provision of apertures, fluid passageways and the like therethrough. These variables will normally be dictated by the structural characteristics of the multiplicity of automatic transmissions that are presently available on the open market by various transmission and auto manufactures.

FIG. 4A illustrates the case where the metal core and each of the gasket layers are separately cut rather than die cut in the assembled or sandwich form. Here metal core 16' is provided with passageways 26' and 30' as in FIG. 4. Gasket layers 18' and 20' have congruent passageways conforming to those of core 16'. However, gasket layer 18' is provided with hole or cut out 17 which may be of any polygonal configuration and for which there is no counter part in gasket layer 20'. But gasket layer 20' is provided with cut out 19', while both gasket layers 18' and 20' are provided with complementary cut outs 21 and 23 respectively. Thus the many variables as to cut outs, holes, passageways and the like are plainly seen where the components 18', 16' and 20' have been separately die cut into the desire shapes and configurations.

Referring now specifically to FIG. 5 and 6, other specific embodiments of the invention are disclosed as they might specifically pertain to a gasket having but a single metal plate or core and a single gasket layer. In this instance, gaskets 34 and 35 are of a shape adapted to serve a specific purpose in the automotive field or otherwise. The metal cores or plates 36 and 37 are adhered, by means of an adhesive bond to but a single gasket layer 40 and 41 respectively. It will be noted that the adhesive bond has not been shown in this instance as it is merely intended to show the versatility of the inventive concept herein. Suffice to say, however, that upon proper bonding, a single or unitary adhesive bond is formed which extends over the entire mating surfaces of the gasket and metal plate. This desirable feature is true for all embodiments, modifications and ramifications of the invention as disclosed herein.

FIG. 7 illustrates still other embodiments of the invention as applied to washer-like structures. Washer 43 illustrates a metal plate disposed between two gasket layers, while washer 45 illustrates but a single gasket layer and washer 47 shows that the gasket as well as core member may be of any desired thickness. All of these constructions are possible of being supplied with precision accuracy in concentricity as well as required flatness.

In each instance, the invention contemplates the performance of certain steps and the provisions of certain materials in order to form valve plate units, gaskets, sealants and the like of this invention. For a clearer understanding of this invention and by way of further disclosure, the following will be helpful.

GENERAL METHODS OF FABRICATION

In general there are two basic methods of fabrication which may be used in accordance with this invention for the fabrication of a valve plate of unitized construction. The first basic approach is to take a roll of sheet metal of appropriate thickness and after it has been appropriately prepared and cleaned to feed it into the nip of a calendering roll in conjunction with cover stock in roll form, with the cover stock being applied either to the top surface of the metal strip or to both the top and bottom surfaces of the metal strip as the material enters the nip of the calendering roll. The metal strip is preferably preheated as it enters the calendering rolls and the cover stock also may be preheated so that the curable cover stock, or an appropriate pre-coating of an adhesive on the cover stock, or an adhesive coating provided on the metal strip will tackify in the calendering rolls and produce a unitized structure, after which the material is die cut to the appropriate shape, either before or after final cure.

The other basic approach for the fabrication of the unitized plate contemplated by this invention is to die cut the metal plates and separately die cut the cover stock (which may be partially cured, or coated with a suitable resinous adhesive material) that is to be united with the metal plate and after the metal plate has been appropriately prepared, cleaned and if desired, provided with a coating which becomes a part of the adhesive bond, assemble the plate with the pre-cut cover stock or gaskets on an appropriate jig and then with the application of heat form an initial bond between the plate and the gasket material after which the assemblage is appropriately cured for ultimate use.

There are many variations in the two above described general approaches to the fabrication of the unitized plate contemplated by this invention including the preparation of the metal core material and the preparation of the cover stock, and these variations will be explained in the disclosure that follows.

THE METAL CORE

In order to provide a metal surface which will be receptive to the formation of an adhesive bond either between it and a single gasket layer, or, when sandwiched between two adjacent gasket layers, then between the metal plate and the two contiguous gasket surfaces, it is necessary to first prepare or clean the metal surfaces to the bare metal removing all oxides, scale and other foreign matter as by chemical treatment, degreasing or the like. Sheet metal stock or roll stock in thicknesses of about 0.030 to 0.060 inches will be used in the practice of the invention, although, of course, other thicknesses may be used if desired. The material commonly used is S.A.E. 1010 cold rolled steel.

Satisfactory types of preparation agents, cleaners, degreasers and the like include such materials as mono-ammonium-phosphate, perchloro-ethylene and various other chemicals familiar to those skilled in the metal cleaning art. Because it is necessary to have a thoroughly clean and prepared receptive surface the metal surface is preferably coated immediately after the initial cleaning step with a material which will make the metal plate surface or surfaces receptive to the formation of an adhesive bond. The particular nature of this coating will be discussed in more detail under the heading "Adhesive Bond".

GASKET LAYER

In general the gasket materials contemplated by this invention for use in the unitized valve plate assembly and in like applications, are those gasket materials commonly used in the art because these materials have proven themselves in service to withstand the rigors of the service conditions found in automatic transmissions. Typical of such gasket materials are those made in accord with the teachings of Kao U.S. Pat. No. 2,676,099, granted Apr. 20, 1954. In a preferred embodiment the gasket material used in this invention comprises a cellulose fiber material such as, for example, wood fiber, coated and combined with a vulcanizable or curable heat resistant rubber compound (including a curing or vulcanizing agent), such as an elastomer which may be a natural rubber but is preferably one of the synthetic rubbers such as neoprene, butadiene, acrylonitrile, butadiene styrene or silicone rubber. For many applications, a nitrile rubber is preferred. Also in some instances a mineral fiber, such as asbestos fiber, or synthetic fibers may be used in place of or in conjunction with the vegetable fibers.

The sheet packing material preferably has a thickness of approximately 0.007 to 0.010 inches but this may vary under particular circumstances.

For some applications of this invention other gasket materials, polymeric materials, resins and elastomers may be used as disclosed in U.S. Pat. to Farnam et al., No. 3,158,626, and made by the methods disclosed in Kao U.S. Pat. No. 2,676,099.

ADHESIVE BOND

An adhesive and/or elastomeric resin composition which has proven particularly suitable for the purposes of the herein disclosed invention, is a curable neoprene and phenolic resin emulsion. When an adhesive and/or elastomeric resin composition is used on the metal core, it is preferably applied in a solvent system, and when used on or with the gasket material, it is preferably applied as a water dispersion. Although this composition is preferred, other adhesives which will withstand the heat and pressure and the action of chemicals and gases, etc. characteristic of those to which gaskets and sealing members are normally exposed may also be used. Whatever adhesive is used it should be capable of withstanding all of the conditions that the gasket material itself is required to withstand, and have the additional properties of not adversely affecting the physical or chemical characteristics of the gasket material or introduce undesirable or harmful contaminants in the transmission.

The neoprenes are important in the field of rubber-type cements. Of particular interest is the addition of phenolic resins to cement formulations which give marked improvement in cohesive strength and grip adhesion to various fibers and particular metals. The particular types of neoprene-phenolic resin contemplated are those which are thermal setting at a temperature of about 325°–400° F. They generally will be applied to either the cleaned metal stock or the gasket layer in as thin a layer as possible. It is essential that the adhesive layer bond between metal and gasket layer be of that thickness necessary to form an adhesive bond between metal and gasket material and no more. Where applied, the thickness of the elastomer-resin layer will be about 0.0002 – 0.0003 inch thick on the metal and about 0.0005 – 0.0007 inch thick on the gasket layer. In the case of the metal, the resin is applied when the metal is in web form using a material such as "Plasticote No. 867" available from Litho-Strip Corp. of Chicago, Illinois. The blend of elastomer and resin is preferably applied in a solvent system which after processing is left behind in a continuous, even thin film. Preferably the coated metal is baked in a high temperature oven to effect a partial cure which makes handling easier but does not completely set the composition.

In the case of gasket material, it too may be treated in the web form using an elastomer-resin in an aqueous system which is subsequently dried for handleability, if the gasket material is die cut prior to assembly with the metal plates.

There are a number of elastomer-resin compositions available, each of which have certain specific advantages. A preferred material has been found to be a blend of nitrile rubber and phenolic resin. It only being important that the elastomer-resin be capable of being applied as a continuous thin layer; that it be such that it can be dried or partially cured for easily handling prior to the final assembly of the gasket member and that it be capable upon final or ultimate curing of producing an adhesive bond between plate and gasket layer over the entire mating surfaces of the respective components.

Compositions which cure-up after the passage of time, etc. should be used with care so that if there is a time period between coating the metal and coating the gasket layer stock, that upon sitting, the materials will not "cure-up" totally thereby producing unusable roll or sheet stock. Those familiar with the elastomer-resin art will readily appreciate that there are a plurality of suitable materials available for use, each having specific desirable and undesirable characteristics depending upon the ultimate environment which the gaskets, sealants or the like will be used. It should be borne in mind, however, that if the adhesive bond layer is not kept extremely thin, and only thick enough to furnish a suitable metal gasket layer bond, the characteristics of the gasket material such as torque retention, distortion and the like will be adversely affected.

SPECIFIC METHODS OF FABRICATION

As heretofore stated, there are two basic methods for fabricating the unitized valve plate assembly or similar article contemplated by this invention. In the first such method, the metal sheet and gasket material are adhered together prior to die cutting of the part, and in the second basic approach, the metal part is die cut and the gasket material die cut and then the assembly is made. There are a number of variations in each such basic approach.

A. ASSEMBLING METAL STRIP WITH GASKET MATERIAL PRIOR TO DIE CUTTING OF PART

The essence of this method is that the metal strip material is fed from the roll together with the gasket material in roll form into the nip of a calendering machine where the metal and gasket material are adhered together by heat and pressure, after which the composite material is die cut to shape and appropriately cured for its end use. In this method the metal strip in coil form, or in plate form, may have been appropriately cleaned of oxides, degreased and otherwise prepared as previously described, and then immediately coated with the elastomer-resin composition previously described to the extent of 0.0002 to 0.0003 inches and suitably dried and/or partially cured, whereupon the material may be handled in the open air without adversely affecting its suitability for combining with the gasket material by this method. Alternatively, the metal stock may be appropriately cleaned and prepared as it is traveling into the nip of the calendering device so that the cover stock, when applied, is on a clean surface and thereby permits the desired bond to be made. In this instance, the gasket material may be in several forms. For example, it may be only partially cured as gasket material and since the elastomer used in the gasket material, as well as the resin therein, has the property of adhering to a clean metal surface when in such condition the heat and pressure applied by the calendering roll will adhere the members together after which the composite sheet may be oven cured to complete the adhesive bond.

Alternatively, the gasket material may be fully cured and have applied to it on its inner surface, i.e., the surface which meets the metal surface, a thin coating of the adhesive material previously described to the extent of from say about 0.0005 inches to about 0.0007 inches and then dried for handleability and again the heat and pressure of the calendering rolls will tackify the adhesive and cause the gasket material to unite with the clean metal surface being fed into the nip of the calendering rolls. The composite sheet is thereafter cured and thereafter the material is die cut to shape.

A third possibility is for the metal strip to be coated with the thin coating of the adhesive and the gasket material to be similarly coated with the adhesive material so that the two, when joined together under heat and pressure, will form an effective bond. In this case a sheet metal or strip metal will have a coating of approximately 0.0002 to 0.0003 inches and the gasket material a coating of from about 0.0005 inches to about 0.0007 inches so that the total thickness of the adhesive bond, prior to the calendering operation, is not in excess of about 0.001 inches.

B. ASSEMBLING OF THE PRE-CUT METAL CORES WITH THE PRE-CUT GASKET MATERIAL

The essence of this method is that the metal strip material is die cut as a separate entity to produce the desired configuration and provided with the fluid passageways and other holes needed in the metal core, all before it is combined with the cover stock. Generally, in these methods the metal core will be of different configuration from the gasket cover and will have holes therethrough different from the pre-cut gasket covers. This may be accomplished in one of two ways. Firstly, the metal strip may be cleaned and prepared and pre-coated with a layer of elastomer-resin as earlier described and then die cut into the desired shape. The pre-cut parts may then be assembled with the gasket cover stock on one or both sides of the metal core so as to form a sandwich. In this method there are a variety of alternatives available as in the earlier described methods in that an adhesive of elastomer-resin may be applied in order to form the adhesive bond or the coating on the metal core itself may be relied upon to form the adhesive bond, either by itself or in conjunction with elastomer-resin material of the cover stock. After assembly of the sandwich a rust inhibitor may be applied to the assemblage in order to coat those surfaces of the metal not covered by a gasket layer or layer of elastomer-resin. Obviously the rust inhibitor selected should be one that is compatible and non-destructive towards the particular elastomer-resin composition chosen and the gasket cover stock. Likewise, the inhibitor should be one that will be compatible with the environment in which the assemblage is to be used. If it is to be a valve plate unit utilized in an automatic transmission the inhibitor should not contaminate the transmission fluid or the like.

Alternately, sheet or strip stock may be die cut into the desired shape or configuration with the appropriate holes being made therein and subsequently subjected to a metal surface cleaning or preparation treatment as earlier described. This cleaning and treating of the die cut metal cores will prepare the surface of the cores for uniting with gasket cover stock. Preferably, immediately after the preparing operation the core is appropriately sandwiched with one or two layers of gasket cover stock on either one or both sides before the metal surfaces have a chance to oxidize or the like. In these instances also, the adhesive bond may be formed by the application of a thin layer of adhesive material of an elastomer-resin composition or may be attained by the elastomer-resin component of the gasket cover stock. Where cover stock is applied only to one side of the metal core, to prevent oxidation of the exposed metal surface of the metal core, it is treated with rust inhibitor as described immediately above. Obviously, again the particular rust inhibitor chosen should be one that is compatible with the various facets of the resin-elastomer, the gasket cover stock and the environment in which the assemblage to which the inhibitor has been applied will be used.

In the above description for the pre-cut methods of assembling the gaskets or valve plates, the coating of adhesive material where used, will be generally about 0.0005 inches to about 0.0007 inches and where the metal either in sheet or strip form is provided with a coating of the elastomer-resin this will normally comprise a layer of the material within the range of about 0.0002 to 0.0003 inches and where the gasket material is provided with a coating this will generally be abut 0.0005 inches to about 0.0007 inches so that in either case the total thickness of the adhesive bond will not be in excess of about 0.001 inches.

Obviously, where drawing, cutting or other compounds or other type metal working lubricants and the like are utilized, they should be removed so as not to interfere with the subsequent formation of the adhesive bond with the gasket layer or layers when the foregoing methods of fabrication are used.

In each of the preceeding descriptions it will be appreciated that a jig-type of apparatus or other mechanical means will be employed in the assembly operation so as to achieve proper alignment of the gasket and metal core components of the unitized gasket and valve plate units of this invention. The specifics of exemplary apparatuses and specifics of the methods involved therewith will now be considered in detail.

SPECIFIC METHODS OF FABRICATION

Figure 9:
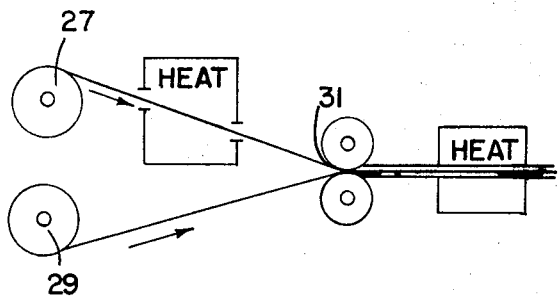
FIG. 9 is a schematic illustration demonstrating one of the methods for fabricating one of the embodiments of the invention.

Referring to FIGS. 8, 9 and 10, there are illustrated several of the methods and apparatuses of practicing several embodiments of the invention.

Reference is now made specifically to FIG. 8, a flow diagram and FIG. 9 illustrating but several of the many variations in fabricating the gaskets, sealants and the like articles of this invention. A coil or roll 27 of metal stock is conducted through a preheater in order to raise the temperature thereof to approximately 275°-300° F. The metal stock has been coated with a uniform layer of, for example, elastomer-phenolic resin of the thermal setting-type to a thickness of about 0.0002 – 0.0003 inch. A roll of gasket material 29 which may or may not be coated with an elastomer-phenolic resin composition is fed to the nip of a high pressure calender 31 and passes therethrough for sandwiching. While only one roll of gasket material and, hence, only one layer of gasket material is applied to one side of the metal stock, it is obvious that another roll of gasket cover stock may be provided so as to form a metal core sandwiched between two layers of gasket material. The gasket layer material in roll 29 may be of a type which has not been completely cured up in its initial manufacture or may be of the type which has been completely cured up and to which has been added an elastomer-resin layer, of about 0.0005 – 0.0007 inch thickness as an adhesive. In any event, the two webs of material coming together at the nip of the calender 31 produces a tackiness or initial bond between the web of cover stock and the web of metal stock. The formed sandwich is then conveyed through another heater to effect final curing of the adhesive bond layer. Where there are separate layers of elastomer-resin material on both the metal and the gasket cover stock, the curing cycle causes a coalescence to occur or a chemical linkage between each of the layers to produce but a single bond in the cured-up sandwich. The aforedescribed sandwiching process may be modified to the extent that an adhesive coating is separately applied to a completely cured-up gasket layer or metal strip having the cured-up adhesive bond composition in order to provide a satisfactory bond. Additionally, the metal need not be coated and could be of the type which has just completed a metal preparation cycle or process so as to prepare the metal for the bonding of the gasket layer thereto.

After the curing process, the sandwich web may be subjected to a stamping or die-cutting process in which event the metal core with a covering sheet on one or both sides will be shaped and sized and have openings produced therein, all of which will be identical in the metal core and gasket layers. Thereafter the finished product may be inspected, packed, shipped and/or stored.

Referring now to FIG. 10 wherein the metal plates and gasket covers are pre-cut before assembly, it will be seen that after the metal core or plate is prepared and coated, it is cut to size as are the gasket layers. Generally, in this instance, the shapes and placement of passageways in gaskets and metal core will not be congruent. The gasket layers are placed in two compartments 42 and 44 of a stacking jig machine 46. Stacking jig machine 46 comprises a table-type surface 43 having supporting legs 50 and removable stacking platform such as 48 through which upstanding guide pins or rods 50 project and which are adapted to receive through aligned complementary holes the prepared core and gasket layers. The indexing member 49 to which the guide pins 50 are secured is adapted to advance to a predetermined upward distance by means of actuator 51, the upward distance being equal to the width of each gasket-core-gasket assemblage. In this manner larger frictional forces between gaskets, core and guide pins are reduced or overcome. Preferably, the stacking support 48 as well as the stacking pins 50 are heated by means not shown so as to heat up the components of each assemblage during the assembly process. A plurality of gasket layers, with a partially cured (or alternatively dried) elastomer-resin layer face down is stacked in the compartment 42 whereas a plurality of cut gaskets having the elastomer-resin layer face-up are stacked in compartment 41. The pre-cut and prepared metal plates or cores are placed in a similar stacking compartment (not shown) in proximity of the stacking plate 48. These plates are preferably preheated to a temperature of about 200° F. in order to cut down on the dwell time required for bond to be formed when the assembled plates and gasket covers are subjected to pressure on a suitable press.

Other interleaving members, preferably of the same material as the gaskets but coated with anti-stick material, may be stacked in ready access for use between adjacent sandwich assemblies (not shown). These members will preferably have surfaces complemental to those surfaces of the sandwich assemblies next to which they are placed so that upon later processing an even pressure may be applied to the assemblies and particularly the metal and gasket adjacent mating surfaces.

In order to fabricate valve plate units such as previously described, vacuum head or heads 52 pick up a single gasket 54 linearly carrying it to a position aligned and spaced above the stacking pins 50 whereat the vacuum is broken thereby allowing the gasket to come down onto stacking plate 48 by the action of gravitational forces. Similarly, a vacuum head (not shown) may place the preheated metal plate on the stacking jig satisfactorily aligning it with the stacking pins 50. Alternatively, the metal plate may be placed on the jig assembly by hand. Thereafter suction heads 56 extract a single gasket such as 58 from compartment 42, carry it over to a point positioned above and aligned with the stacking pins 50 whereat the vacuum is broken allowing the gasket 58 to fall on top of the metal plate. This sequential operation is repeated a plurality of times, placing the heretofore mentioned interleaving members for even pressure distribution between assemblages, until the removable stacking jig is completely filled. At this point a retaining member 53 is positioned on the uppermost assemblage. The plurality of members, with stacking plate 48 and retaining member 53 maintaining them in a unitary manner, is then stripped from the stacking or guide pins for subsequent treatment.

Thereafter the plurality of assemblages or sandwiches of metal plate and gaskets are passed, if required, through a preheating device such as an oven to bring the temperature of the interleaved or sandwiched metallic cores to a temperature of from 150° - 180° F. This will achieve two purposes: Firstly, the temperature of the sandwiches or assemblages will be brought up to a point wherein subsequent heating is more easily effected; secondly, the preheating allows for de-gassing or the driving-off of moisture, gases and the like from components of the assemblages prior to final curing in the ultimate step of the operation.

After preheating, during assembly and after treatment in the preheating oven, the assembly or sandwiches still on the individual stacking jigs are placed in a hydraulic press and subjected to pressures in the range of 500 – 1,000 psi and temperatures of about 325°- 350° F. During the initial phase of the heating operation, the press is closed and held for a specific period of time and quickly opened and again reclosed to allow for additional "bumping" to make sure that all volatile components are driven from the press and the individual components of the individual assemblages. The specific temperature, of course, will depend upon the adhesive bond composition used with the metal core and gasket layers. The temperature should be such that it will be kept below the decomposition temperature of the specific material but high enough in conjunction with the pressures utilized to effect total curing of the composition. In some instances, compositions may be employed which do not require the specific range of temperatures mentioned above, or, for that matter, will not necessitate the use of pressure for curing or for intimate contact engagement. However, it has been found in the preferred type of elastomer-phenolic resin compositions referred to earlier that the heat and pressure combination provides the most desirable adhesive bond.

Generally speaking, the period of curing will take from about 5 to 8 minutes at temperatures around 325°-350° F. by which time the adhesive bond composition will have become totally cured, forming a chemical bond coalesced into a single adhesive bond layer.

Other modes of fabricating the gaskets, valve plate units and the like are, of course, practical technically and economically, one such means and method being by, for instance, the type of apparatus and the general method disclosed in the application of Robert G. Farnam, Ser. No. 555,393, filed June 6, 1966, and entitled "Apparatus for Forming Laminates." However, because of the particular requirements for the manufacture of the articles of this invention and making specific reference to FIGS. 11, 12 and 13, a suitable modified apparatus is shown. In this instance, indexing table 60 has mounted onto its outer edge evenly spaced perches 62. The perches 62 consist of bars or rods 64 extending horizontally outwards onto which is attached heavy plate 66. The rods 64 are adjustable for length measured from the center of the indexing table 60 to allow for adjustment and expansion, and long enough and properly sized to allow for a little flexing so that at the pressing station where the composite assembly on the pin molds assembly 68 is pressed under high pressure, each component of pin mold assembly 68 can readily align without putting undue strain on the perch 64 with the pin mold assembly clamped tightly to it.

The apparatus and procedure will be described for the assembly 63 of a three-piece transmission plate composite consisting of a die cut gasket 65 on either side of a die cut steel plate 67 with the holes in each gasket 65 exactly the same size and shape as the holes in the steel plate 67. The example further considers that the steel plates have been precoated as previously described and likewise the gasket material has been precoated with dried but uncured adhesive on one side, and if required a release coat on the opposite side. The same system and apparatus could be used with plates that have not been precoated but are used in the assembly after passing through a degreasing and/or steel preparation system and preheated as heretofore described.

As indexing table 60 rotates by means of an incremented drive system (not shown) a distance equal to the center-line distance between perches 62, an assembler at station A, manually places onto a heated pin mold assembly 68 the die cut gasket, adhesive side up. A suitable number of pins 70 would be 3 to 5, the pins being tapered at the top to allow for quick assembly. The table 60 rotates to station B in the direction of the arrow, with a dwell time for each station appropriate for the parts being made. A typical dwell time for the transmission separator plate assembly would be approximately 1 to 1.5 seconds (where a single composite part is being acted upon at each station). Obviously, other parts might require longer dwell times to give ample time for loading or other operations performed at a given station. At station B, the operator places onto the pin mold assembly 68 a preheated steel plate obtained from preheating holding oven or conveyorized preheating oven 72. Alternatively, where the steel plate is not precoated, a combination metal preparation, drying and heating unit 73 may be positioned adjacent station B from which the preheated steel plates are taken.

Table 60 rotates to station C, where as assembler places a gasket with the adhesive side down on top of the steel plate. The table 60 increments again to station D which for purposes of illustration is depicted as using the apparatus of FIG. 12 at which point the assembly "sandwich" is given a light press or "spank" automatically, utilizing air press 74 which with a C-Frame 76 and a cushioned plate 78 with holes 79 to match the pins 70 in the mold assembly 68 descends down quickly to press together firmly and under a light load of about 100 to 200 pounds total load (not psi). This load will vary depending on the shape, type of material, friction on the pins, number of pins, etc. The procedure is simply to make sure that the parts of the sandwich are snugged down over the tapered part of the pins 70 and tight and aligned against the bottom plate 80 of pin mold assembly 68. The light press on spank is accomplished during the dwell time between incremental rotation of table 60. Between stations D and F (the high pressure station hereinafter described) is heating chamber 82 to regulate and unify the temperature of the assembly 63 for positive control.

The adhesive or bonding material, as previously explained, is very sensitive to temperature in respect to tackiness. Those familiar with assemblies of this type, using adhesives of this type, know that it is necessary to regulate and control accurately the temperatures in order to get the adhesive to tack securely and uniformly. Too much temperature and/or too long a period of time, or combinations of these two could very readily begin a slight curing and would cause the surfaces to lose their tack. Too low a temperature on the other hand would be insufficient to render the coated surfaces tacky.

Table 60 next increments to station F, the high press station (FIG. 12). At station F, C-Frame hydraulic press 74 automatically descends with a cushioned top plate 78 under psi loads previously discussed, generally around 1,000 psi for a duration of about 1.0 - 1.5 seconds, and with the top and bottom platens 84 and 86 respectively, heated and controlled, with the dwell long enough to match the cycle or increment of table 60. Station G is a blank station, to provide space for additional or alternate operations.

Continuing on, table 60 next increments to station H (FIG. 13) which is an ejector station which automatically ejects or strips the assembly 63 from the pin mold assembly 68. At this station there is positioned a very fast acting, air-actuated press 88. The stripper plate 80 of the pin mold assembly 68 extends outwards and beyond the edge of the pin plate 81 far enough so that it may pass through U-shaped slides 90 of stripper arms 92 attached to a yoke (not shown) which in turn is actuated in an up-and-down manner by an air cylinder system (not shown). This up-and-down stripper action is very fast. An operator sits or stands at station H and removes the composite 63 and places it into a conveyorized unit 94 such as a wicket type oven where the composite 63 is automatically conveyed through the oven and heated to curing temperature, then cooled, and if required sprayed with a mist of rust inhibitor which doesn't affect the gasket material. Use of a rust inhibitor if required would generally only be applicable to the composite that utilizes plain steel, or steel that had not been precoated as previously described and discussed. An operator at the end of unit 94 would then inspect and pack the finished parts.

Table 60 next rotates through a heating oven 96 for heating the pin mold assembly 68 and then back to station A where the process is repeated. It can readily be understood that the method of heating the pin molds is more or less arbitrary in that they could be electrically heated individually. Likewise, the heating zones could have an electric heat supply, such as heating elements, infra-red lights; or gas, etc.

Various modifications are, of course, indeed possible in the articles of the invention. For instance, it is contemplated that for various applications it may be desirable to furnish an elastomer-resin, coating or layer on the exterior of the gasket layers and same may be applied as it was similarly applied to those surfaces now mating with the metalic core. In other instances, it may be desirable to furnish a release coating on the exposed gasket layer surfaces so as to make their disassembly at a later time from the valve regulator or other apparatus more easily effected. By release coating is meant some of the well-known anti-stick compositions or, for that matter, release coating compositions which are generally known in the art and have found acceptance therein, especially where gaskets, sealants and the like members are expected to be disassembled from the assemblies in which they are used.

A review of certain test data obtained from testing one embodiment of the invention in the form of a valve plate unit, wherein the metal core was sandwiched between two gasket layers, against the prior art three-piece assemblage will be enlightening. In the fabrication of the unitized test sample, following the teachings of the invention, a steel core of SAE 1010 C/R steel, No. 4 temper, having a nominal thickness of 0.030 inches and having an elastomer-resin coating thereon about 0.0002 - 0.0003 inches thick was sandwiched between two layers of cover stock. The cover stock was vegetable fiber reinforced rubber sheet packing having a compounded and cured nitrile rubber binder commercially available under the trade name "KAOPAK B1116-130" available from the F. D. Farnam Co. The cover stock was made generally in accordance with Kao U.S. Pat. No. 2,676,099 and had a weight of approximately 0.40 pounds per square yard of the material with a thickness of 0.0085 inches. An adhesive coating of elastomer-phenolic resin was applied to the cover stock and dried for handleability. The type of elastomer-resin composition used was that as disclosed in Farnam et al U.S. Pat. No. 3,158,626. The steel core was then sandwiched between the cover stock and then subjected to heat and pressure in order to form an adhesive bond line of about 0.0005 – 0.00075 inches. The assemblage was subsequently air cured and thereafter die cut to form an assemblage wherein the core and gasket covers had the identical shape and configuration. The test sample fabricated to represent the prior art three-piece assemblage was made from the same materials as the unitized valve plate test assembly and each component of the assembly was identical to that making up the unitized test sample with the exception that no elastomer-resin was applied either on the metal surface of the core or the gasket layer as in the unitized test sample and thus there was no adhesive bond layer.

Using test samples as constructed above, a series of standard tests were conducted in order to determine the various characteristics of each of the test samples. The following data was obtained following the indicated test procedures for each of the test samples.

SEALABILITY

| Lockup Load | Sealability cc/hr. | |
|---|---|---|
| | 1-piece | 3-piece |
| 250 psi | 12.12 | 16.20 |
| 500 psi | 3.84 | 5.64 |
| 1000 psi | 0.48 | 0.84 |

Method of test: ASTM F–37–62T
ASTM Reference Fuel A at room temperature.
Lockup 250, 500, 1000 psi; - 30" of mercury.
Soaking period: 5 minutes.

Reviewing the above data and test procedure it is apparent that the method and fluid used in the test was much more severe than that normally found in a transmission environment and the data makes it clear that the one-piece or unitized assemblage of one embodiment of the invention gives much better sealability than the prior art assembly.

COMPRESSIBILITY

| Major Load | Compressibility % | |
|---|---|---|
| | 1-piece | 3-piece |
| 1000 psi | 3.58 | 4.00 |
| 2000 psi | 4.60 | 5.40 |
| 3000 psi | 5.62 | 6.60 |
| 4000 psi | 6.20 | 7.10 |
| 5000 psi | 7.20 | 7.64 |
| 10000 psi | 9.23 | 9.33 |

Method of test: ASTM F–36–66
Major loads: 1000 psi, 2000 psi, 3000 psi, 4000 psi 5000 psi, 10,000 psi
Pre-load: 1 pound

CLAMP LOAD RETENTION

| | % Clamp Load Retention | | | |
|---|---|---|---|---|
| | 1-piece | | 3-piece | |
| Unit Load | 212°F | 300°F | 212°F | 300°F |
| 3000 psi | 85.7 | 79.2 | 77.8 | 70.7 |
| 6000 psi | 86.1 | 81.6 | 81.3 | 74.4 |

Loads of 3,000 and 6,000 psi were applied at 212° F. and 300° F. The equipment used was that normally employed in making clamp load retention tests and the data demonstrates that better clamp load retention properties are inherent in the unitized member of this invention as opposed to the prior art three-piece assembly.

Other tests were conducted on specialized and modified equipment and the results of the tests indicated that the unitized valve plate of this invention had excellent adhesion properties, perfect dimensional stability, and superior handling properties to those of the prior art three-piece assembly. Furthermore, when subjected to erosion tests it was found that the erosive environment had no effect on the unitized member whereas in other instances the same environment caused the three-piece prior art assembly to fail. It is quite obvious, therefore, that the valve plate units, gaskets and other embodiments of the invention represent a substantial advance over the prior art.

While disclosures of preferred embodiments of the articles of this invention and of the preferred methods of fabricating them have been employed, it will be apparent that numerous modifications and variations thereof may be made without departing from the underlying principles of the invention. It is, therefore, desired by the appended claims to include within the scope of the invention all such variations and modifications by which substantially the results of this invention may be obtained through the use of substantially the same or equivalent means.

I claim

1. A valve plate assembly used in combination with an automatic transmission comprising a steel plate having a thickness of not more than about .060 inch and having at least one of its faces completely planar, said plate having a plurality of openings therethrough defining with the plate perimeter a first configuration, a gasket facing for said one face comprising a preformed die-cut sheet of fiber-reenforced elastomeric material, said gasket facing with its plurality of precut openings therethrough presenting a different configuration from that of the steel plate whereby when said gasket facing is adhered to the steel plate there are at least some areas of the steel plate which are left uncovered by said gasket material, said gasket facing having a uniform thickness of not more than about 0.010 inch, and the adhesive bond between the gasket facing and the said plate being coextensive with the entire mating surface between the gasket facing and the plate and being a thermosetting polymeric material having a thickness of not more than about 0.001 inch and curable at temperatures between approximately 325° and 400° F.

2. A valve plate assembly as set forth in claim 1 in which the gasket material is a homogeneous mass of elastomer reenforced with cellulose fibers.

3. A valve plate assembly as in claim 2 in which the bonding material is a synthetic elastomer-resin adhesive.

4. A unitized valve plate assembly used in combination with an automatic transmission comprising a steel plate of uniform thickness having adhered to each face thereof a gasket sheet having a thickness of not more than about 0.010 inch which has been precut to provide a configuration compatible with a plurality of openings in the steel plate, the unitized assembly being characterized by improved sealability and clamp load retention over a valve plate assembly comprising a steel plate and discrete unadhered gasket sheets of identical material and configuration, said gasket sheets having a uniformly thin adhesive bond of not more than about 0.001 inch in all mating areas between the gasket sheet and the steel plate, and comprising a thermosetting polymeric material curable at temperatures between approximately 325° and 400° F.

5. A unitized valve plate assembly as in claim 4 in which the gasket material is a homogeneous mass of elastomeric material reenforced with cellulosic fibers.

6. A unitized valve plate assembly as set forth in claim 5 in which the thermosetting polymeric material is a synthetic elastomer-resin adhesive material.

* * * * *